United States Patent
Kim et al.

(10) Patent No.: US 8,479,224 B2
(45) Date of Patent: Jul. 2, 2013

(54) DISK DRIVE

(75) Inventors: Hag-Ryeol Kim, Yongin-si (KR);
Hyun-woo Lee, Suwon-si (KR);
Young-woo Back, Suwon-si (KR);
Sung-hun Lee, Yongin-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 13/288,061

(22) Filed: Nov. 3, 2011

(65) Prior Publication Data
US 2012/0174133 A1 Jul. 5, 2012

(30) Foreign Application Priority Data
Dec. 31, 2010 (KR) .................. 10-2010-0140687

(51) Int. Cl.
*G11B 33/02* (2006.01)
(52) U.S. Cl.
USPC ....................................................... 720/610
(58) Field of Classification Search
USPC ....................................................... 720/610
See application file for complete search history.

(56) References Cited

U.S. PATENT DOCUMENTS

| | | | | |
|---|---|---|---|---|
| 7,043,740 | B2 * | 5/2006 | Chen et al. | 720/610 |
| 7,073,183 | B2 * | 7/2006 | Hekizono | 720/610 |
| 7,127,727 | B2 * | 10/2006 | Hsu et al. | 720/637 |
| 7,386,867 | B2 * | 6/2008 | Yang et al. | 720/610 |
| 7,610,590 | B2 | 10/2009 | Nasu et al. | |
| 7,617,506 | B2 * | 11/2009 | Harada et al. | 720/610 |
| 2004/0117807 | A1 * | 6/2004 | Takahashi et al. | 720/610 |
| 2004/0210917 | A1 * | 10/2004 | Chen | 720/610 |
| 2005/0071858 | A1 * | 3/2005 | Chen et al. | 720/610 |
| 2006/0161931 | A1 * | 7/2006 | Chen et al. | 720/610 |
| 2007/0028250 | A1 * | 2/2007 | Chien et al. | 720/610 |
| 2007/0028251 | A1 * | 2/2007 | Yang et al. | 720/610 |

FOREIGN PATENT DOCUMENTS

| | | |
|---|---|---|
| JP | 10-269666 | 10/1998 |
| KR | 10-2012-0078401 | 7/2012 |

* cited by examiner

*Primary Examiner* — Mark Blouin
(74) *Attorney, Agent, or Firm* — NSIP Law

(57) ABSTRACT

A disk drive that includes (i) a main chassis, (ii) a tray that is configured to have a disk removably mounted thereon and that is installed to slide into/out of the main chassis, and that includes a pickup transporting unit configured to move a pickup base back and forth in a radial direction of the disk, and (iii) a lock releasing unit that is arranged on the tray, that is driven by the pickup transporting unit, and that releases a lock of the tray from the main chassis.

24 Claims, 6 Drawing Sheets

DISK DRIVE

CROSS-REFERENCE TO RELATED PATENT APPLICATION

This application claims the benefit of Korean Patent Application No. 10-2010-0140687, filed on Dec. 31, 2010, in the Korean Intellectual Property Office, the entire disclosure of which is incorporated herein by reference for all purposes.

BACKGROUND

1. Field

The following description relates to a disk drive, and additionally, to a disk drive having a tray lock releasing unit that prevents a lock of a tray from being released from a main chassis even if a pickup base is moved by an external shock, and a method of releasing a tray lock by using the tray lock releasing unit.

2. Description of the Related Art

A disk drive is a device that writes to or reads data from a recording medium. A disk drive writes to or reads data from a recording medium, such as a compact disc (CD) or a digital versatile disc (DVD), a Blu-ray disc (BD), by emitting light thereto.

A disk drive includes a main chassis, a tray on which a disk is loaded and that slides into/out of the main chassis, and a cover that forms an exterior of the disk drive and protects internal structures and electronic devices. The tray includes a spindle motor for rotating a disk loaded on the tray, an pickup unit for reproducing data from or writing data to a disk, and a pickup transporting unit for moving an pickup base on which the pickup unit is installed between an inner circumference and an outer circumference of a disk.

A disk drive includes a locking unit that is configured to lock a tray relative to the main chassis so as to maintain the tray in a locked position relative to the main chassis. The disk drive also includes a lock releasing unit that is configured to release the tray from the locked position. In other words, the lock releasing unit separates the tray from the main chassis. A conventional lock releasing unit uses a solenoid to release a lock of a tray with respect to a main chassis. However, such a conventional lock releasing unit requires a separate solenoid. Therefore, there is a space-wise limit due to installation of the solenoid, and additional cost is required. Furthermore, a lock may be released and a tray may be ejected from a main chassis, due to malfunction of a solenoid that may be caused by, for example, an external shock.

SUMMARY

In one general aspect, there is provided a disk drive. The disk drive includes a main chassis, a tray that is configured to have a disk removably mounted thereon and that is installed to slide into/out of the main chassis, the tray comprising a pickup transporting unit that is configured to move a pickup base back and forth in a radial direction of the disk, and a lock releasing unit which is arranged on the tray, is driven by the pickup transporting unit, and releases a lock of the tray from the main chassis.

The disk drive may include a lock releasing unit that includes a lock lever unit which is rotatably installed on the tray and which comprises a hook which is to be combined with a locking protrusion arranged on the main chassis, a link unit which is rotatably installed on the tray and which comprises a driving force transmitting unit, wherein the driving force transmitting unit is combined with the pickup transporting unit and receives a rotation force, and a connecting unit which is rotatably installed on the tray, is connected to the lock lever unit and the link unit, and rotates the lock lever unit by transferring to the lock lever unit a force which is based on a rotation force that the connecting unit receives from the link unit.

The disk drive may include a link unit that further includes comprises an interfering unit that is configured to move based on its engagement with a feeding guide that operatively connects the pickup base to the pickup transporting unit, and if the interfering unit engages the feeding guide and the link unit rotates, the driving force transmitting unit is combined with the pickup transporting unit.

The disk drive may include a lock releasing unit that further includes a spring which is fixed to the lock lever unit and the connecting unit, and which applies an elastic force in a direction in which the hook is engaged with the locking protrusion.

The disk drive may include a driving force transmitting unit that is formed of a protrusion having a predetermined height which is configured to be combined with a lead screw of the pickup transporting unit.

The disk drive may include a pickup base position defining unit that defines a position of the pickup base under the condition that the driving force transmitting unit is combined with the lead screw.

The disk drive may include a stopper which is arranged on the tray so as to define an initial position of the lock releasing unit, the stopper being arranged so as to engage the link unit.

The disk drive may include a position defining unit that defines the initial position of the lock releasing unit, that is installed on the connecting unit, and that contacts a frame of the tray when the link unit contacts the stopper.

The disk drive may be included in an electronic device.

The electronic device may be one of a portable game console, a portable/personal multimedia player (PMP), a portable lap-top PC, a desktop PC, a game console, a high definition television (HDTV), an optical disc player/recorder, and a set top box In another aspect, there is provided a disk drive. The disk drive includes a main chassis, a tray that is configured to have a disk removably mounted thereon and that is installed to slide into/out of the main chassis, the tray comprising a pickup transporting unit that comprises a lead screw and a step motor that is configured to rotate the lead screw and to move a pickup base back and forth in a radial direction of the disk, and a lock releasing unit that is arranged on the tray, that is configured so as to not release a lock of the tray if the lock releasing unit is combined with the lead screw by the pickup base, and that is configured to release the lock of the tray from the main chassis if the lock releasing unit is driven by the lead screw.

The disk drive may include a lock releasing unit that includes a lock lever unit which is rotatably installed on the tray and which comprises a hook which is to be combined with a locking protrusion arranged on the main chassis, a link unit which is rotatably installed on the tray and which includes a driving force transmitting unit, wherein the driving force transmitting unit is combined with the pickup transporting unit and receives a rotation force, and an interfering unit that is configured to move based on its engagement with a feeding guide that operatively connects the pickup base to the pickup transporting unit, and a connecting unit which is rotatably installed on the tray, is connected to the lock lever unit and the link unit, and rotates the lock lever unit by transferring to the lock lever unit a force which is based on a rotation force that the connecting unit receives from the link unit.

The disk drive may include a lock releasing unit that further includes a spring which is fixed to the lock lever unit and the connecting unit, and which applies an elastic force in a direction in which the hook is engaged with the locking protrusion.

The disk drive may include a driving force transmitting unit that is formed of a protrusion having a predetermined height which is configured to be combined with a lead screw of the pickup transporting unit.

The disk drive may include a pickup base position defining unit that defines a position of the pickup base under the condition that the driving force transmitting unit is combined with the lead screw.

The disk drive may include a stopper which is arranged on the tray so as to define an initial position of the lock releasing unit, the stopper being arranged so as to engage the link unit.

The disk drive may include a position defining unit that defines the initial position of the lock releasing unit, that is installed on the connecting unit, and that contacts a frame of the tray when the link unit contacts the stopper.

The disk drive may be included in an electronic device.

The electronic device may be one of a portable game console, a portable/personal multimedia player (PMP), a portable lap-top PC, a desktop PC, a game console, a high definition television (HDTV), an optical disc player/recorder, and a set top box In another aspect, a method of releasing a lock of a tray from a main chassis by using a lock releasing unit which includes a lock lever unit which is rotatably installed on the tray and which comprises a hook that is to be combined with a locking protrusion arranged on the main chassis; a link unit that is rotatably installed on the tray and comprises a driving force transmitting unit, wherein the driving force transmitting unit is combined with the pickup transporting unit and receives a rotation force, and an interfering unit that is configured to be moved based on contact with a feeding guide that connects the pickup base to the pickup transporting unit; and a connecting unit that is rotatably installed on the tray, is connected to the lock lever unit and the link unit, and rotates the lock lever unit by using a rotation force of the link unit. The method includes combining the lock releasing unit with the pickup transporting unit, releasing a lock of the tray from the main chassis, and returning the lock releasing unit to the initial position thereof.

The method may include during the step of combining the lock releasing unit with the pickup transporting unit, the pickup base being moved in the outer circumferential direction of the disk by rotating the step motor according to a lock releasing signal, the link unit rotating as the feeding guide engages the interfering unit; and the driving force transmitting unit being combined with the lead screw due to the rotation of the link unit.

The method may include during the step of releasing lock of the tray from the main chassis, the step motor being driven and rotates the lead screw, the driving force transmitting unit moving together with the lead screw and rotates the link unit, and if the rotation of the link unit is transmitted to the lock lever unit via the connecting unit, the lock lever unit rotates, and the hook is released from the locking protrusion.

The method may include if the hook is separated from the locking protrusion, movement of the pickup base being restricted by the pickup base position defining unit, and a position of the pickup base being unchanged.

The method may include during the step of returning the lock releasing unit to the initial position thereof, the lead screw reversely rotating as the step motor reversely rotates, the driving force transmitting unit moving together with the lead screw and reversely rotates the link unit, and as the driving force transmitting unit is separated from the lead screw, the link unit being returned to the initial position.

Other features and aspects may be apparent from the following detailed description, the drawings, and the claims.

Figure 1:
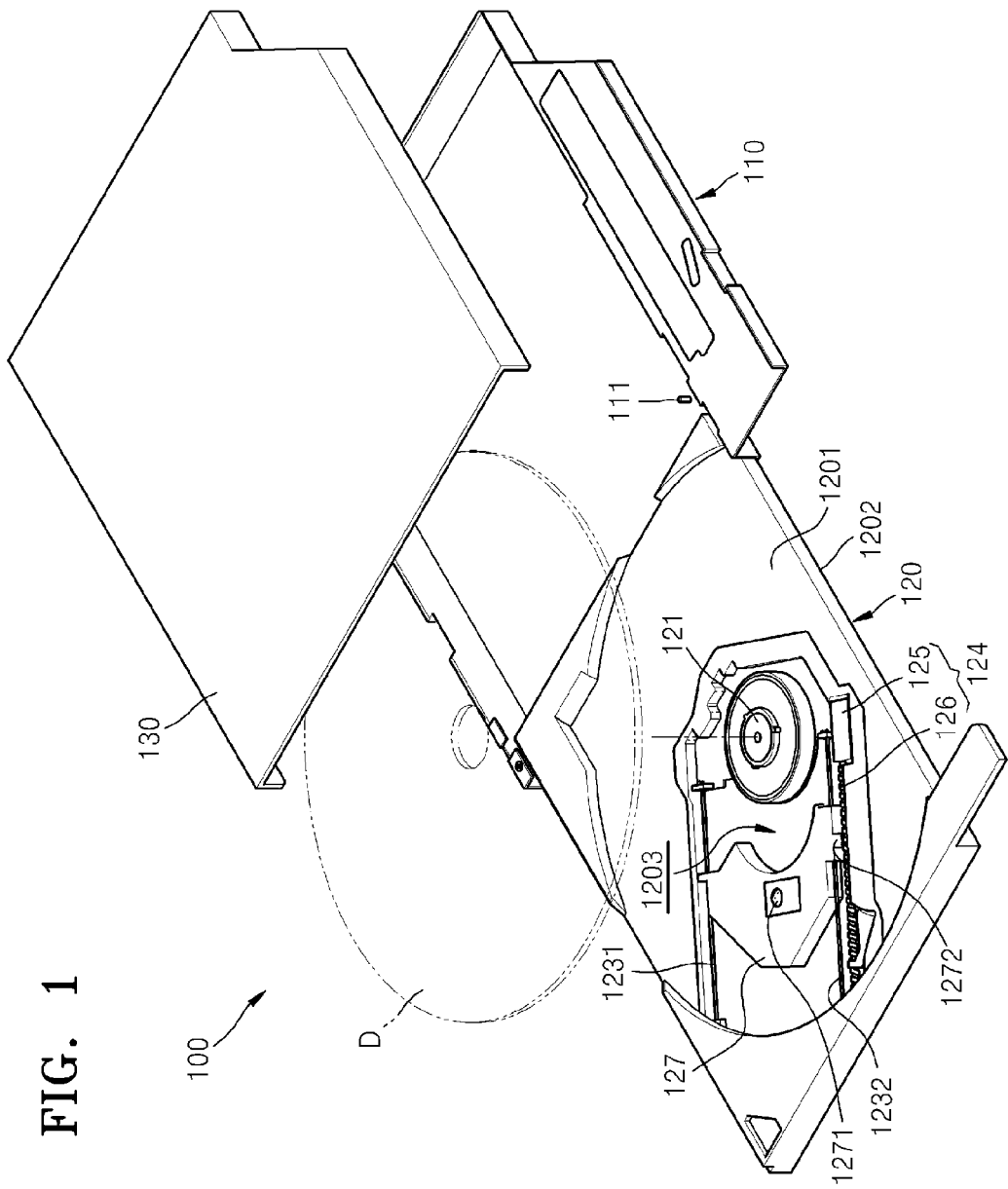
FIG. 1 is a drawing illustrating an example of a disk drive having a lock releasing unit.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 2:
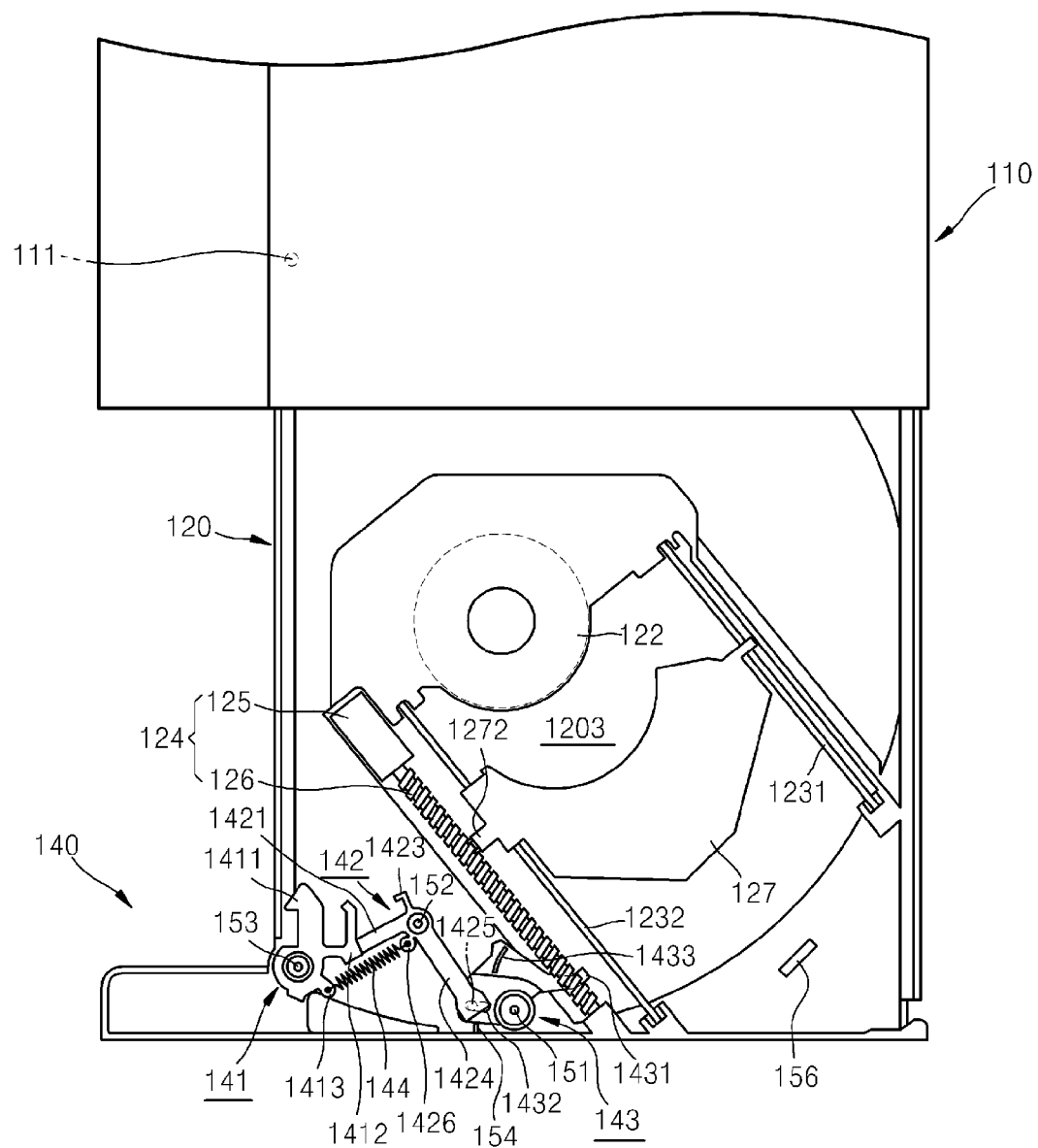
FIG. 2 is a drawing illustrating an example of a rear side of the disk drive.
Figure 3:
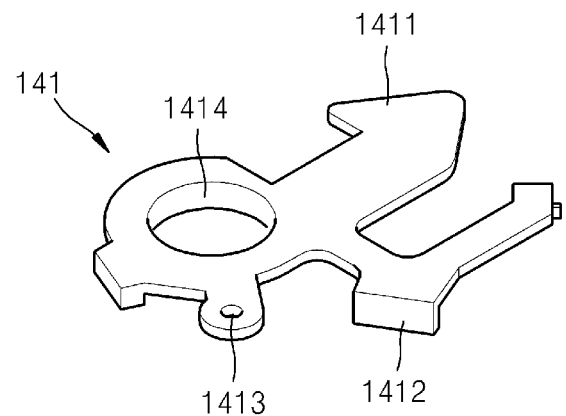
FIG. 3 is a drawing illustrating an example of a lock lever unit of a lock releasing unit.
Figure 4:
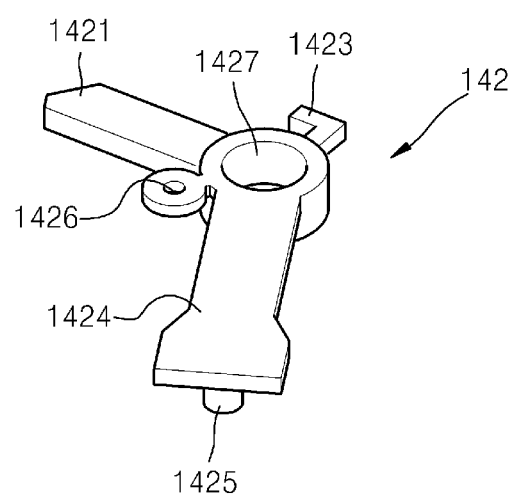
FIG. 4 is a drawing illustrating an example of a connecting unit of the lock releasing unit.
Figure 5:
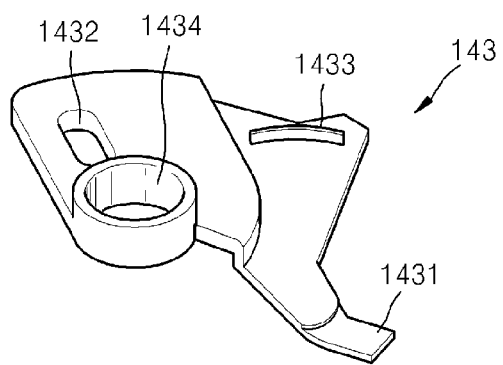
FIG. 5 is a drawing illustrating an example of a link unit of the lock releasing unit.

FIG. 1 is a drawing illustrating an example of a disk drive having a lock releasing unit. FIG. 2 is a drawing illustrating an example of a rear side of a disk drive. FIG. 3 is a drawing illustrating an example of a lock lever unit of a lock releasing unit. FIG. 4 is a drawing illustrating an example of a connecting unit of a lock releasing unit. FIG. 5 is a drawing illustrating an example of a link unit of a lock releasing unit shown.

Referring to FIGS. 1 through 5, a disk drive 100 includes a main chassis 110, a cover 130, and a tray 110. The cover 130 that covers a top of the main chassis 110 so as to form a predetermined space between the cover 130 and the main chassis 110 into and out of which the tray 120 is configured to slide. The tray 120 is installed in the disk drive 110 (e.g., to the main chassis) so as to be able to slide into and out of the main chassis 110 with a disk D mounted thereon.

For example, the tray 120 comprises a turntable 121, a driving motor 122, a pickup base 127, a pickup unit 1271, a plurality of guiding shafts 1231 and 1232, a pickup transporting unit 124, and a feeding guide 1271. The turntable 121 is configured to have a disk D mounted thereon. For example, the disk D may be a CD, DVD, Blu-ray, or the like. The driving motor 122 is configured to rotate the turntable 121. The tray includes a pickup base 127 on which a pickup unit 1271 is installed. The pickup unit 1271 may be, for example, an optical pickup unit. The pickup unit 1271 is configured to write data to or read data from the disk D. For example, the pickup unit 1271 may write data to or read data from the disk D by emitting light to the disk D. The tray may have a plurality of guiding shafts 1231 and 1232 that are arranged a predetermined distance apart from each other so as to guide the pickup base 127 to move back and forth in a radial direction relative to the disk D. A pickup transporting unit 124 is configured to move the pickup base 127 relative to the disk D. For example, the pickup transporting unit 124 may include a lead screw 126 that is configured to move the pickup base 127 back and forth in the radial direction of the disk D. For example, the lead screw 126 may extend in a direction substantially parallel to the plurality of guide shafts 1231 and 1232. The pickup transporting unit 124 may include a step motor 125 which is configured to rotate the lead screw 126. A feeding guide 1272 is arranged on the pickup base 127. The feeding guide 1271 transmits a rotation force of the lead screw 126 to the pickup base 127.

A lock releasing unit 140 is installed on a bottom surface 1202 of the tray 120. The lock releasing unit is configured to release a lock of the tray 120 if the tray 120 is inserted into the main chassis 110 and locked. For example, the lock releasing unit 140 may selectively release a lock of the tray 120. The lock releasing unit 140 may release a lock of the tray 120 in response to a user input or if a predefined operation condition is met. The lock releasing unit 140 may include a lock lever unit 141, a connecting unit 142, and a link unit 143. The lock releasing unit 140 is arranged in proximity to the lead screw 126 and releases a lock of the tray 120 which is operatively linked with the lead screw 126.

The lock lever unit 141 is a unit that locks and releases the tray 120. For example, the lock lever unit 141 controls whether the tray 120 is locked in a locked position or whether the tray 120 is able to freely move into and out of the space defined by the main chassis 110 and the cover 130. The lock lever unit 141 may include a hole 1414 that is formed so as to penetrate through the lock lever unit 141. In other words, the hole 1414 may be a socket formed in the lock lever unit 141. The hole 1414 may have a rotating shaft 153 inserted there through so as to allow the lock lever unit 141 to rotate. The rotating shaft 153 is arranged on the bottom surface 1202 of the tray 120. The lock lever unit 141 also includes a hook 1411 that may be moved so as to selectively engage a locking protrusion 111 that protrudes from a rear surface of the main chassis 110. For example, the hook 1411 may engage the locking protrusion 111 if the tray 120 is locked. The lock lever unit 141 also includes rotation force receiving unit 1412 that contacts the connecting unit 142 to receive a rotation force, and a spring fixing unit 1413 by which a first end of a spring 144 is fixed.

The link unit 143 is a unit that transmits a rotation force. For example, the link unit 143 may transmit a rotation force to the connecting unit 142. The link unit 143 includes a hole 1434 that is formed penetrating there through the link unit 143 and through which a rotating shaft 151 that is arranged on the bottom surface 1202 of the tray 120 may be inserted and rotated. The link unit 143 also includes a driving force transmitting unit 1433. The driving force transmitting unit 1433 may be a protrusion having a predetermined length and a predetermined height. The driving force transmitting unit 1433 may selectively engage or be selectively combined with the lead screw 126. The link unit 143 may include a connection hole 1432; the connection hole 1432 operatively connects the link unit 143 with the connecting unit. The link unit may also include an interfering unit 1431 that extends from the link unit 143 by a predetermined length so as to selectively contact the feeding guide 1272. The driving force transmitting unit 1433 and the interfering unit 1431 are formed to face the lead screw 126.

The connecting unit 142 is a unit that rotates the lock lever unit 141 by transferring a rotation force which was transmitted to the connecting unit 142 by the link unit 143. The connecting unit 142 includes a hole 1427 that is formed so as to penetrate through the connecting unit 142. A rotating shaft 152 is arranged on the bottom surface 1202 of the tray 120 and may be inserted into the hole 1427. The rotating shaft 152 may be configured to selectively rotate in the hole 1427. The connecting unit 142 includes a first connecting unit 142, a second connecting unit 1421, a connecting unit 1426, and a position defining unit 1423. The first connecting unit 1424 may be operatively connected to the connecting hole 1432 of the link unit 143. For example, the first connecting unit 1424 may have a connecting protrusion 1425 that is inserted into the connecting hole 1432 of the link unit 143. The connecting unit 142 also includes a second connecting unit 1421 that may be operatively connected to the rotation force receiving unit 1412 of the lock lever unit 141. The connecting unit 1426 is operatively connected to the second end of the spring 144. The position defining unit 1423 is configured to define an initial position of the lock releasing unit 140.

A stopper 154 which is disposed in close proximity to the link unit 143 so as to define an initial position of the lock releasing unit 140 is arranged on the bottom surface 1202 of the tray 120. As illustrated in FIG. 2, if the tray 120 is in an ejected state (e.g., if the tray 120 protrudes from the space defined by main chassis 110 and the cover 130), the lock releasing unit 140 is configured to be in an initial position, whereat the tray 120 is released from the main chassis 110. For example, the lock releasing unit 140 may be in an unlocked state if the tray is in an ejected state. At this point, the link unit 143 engages the stopper 154, and the position defining unit 1423 of the connecting unit 142 engages a frame 155 of the tray 120. Accordingly, the initial position of the lock releasing unit 140 may be defined by the stopper 154 and the position defining unit 1423.

A pickup base position defining unit 156 which defines positions of the pickup base 127 is arranged on the bottom surface 1202 of the tray 120. For example, an outermost position of the pickup base 127 may be defined by the pickup base position defining unit 156.

An elastic force is applied to the lock lever unit 141 by the spring 144 in such a direction so as to engage the hook 1411 with the locking protrusion 111.

Figure 6:
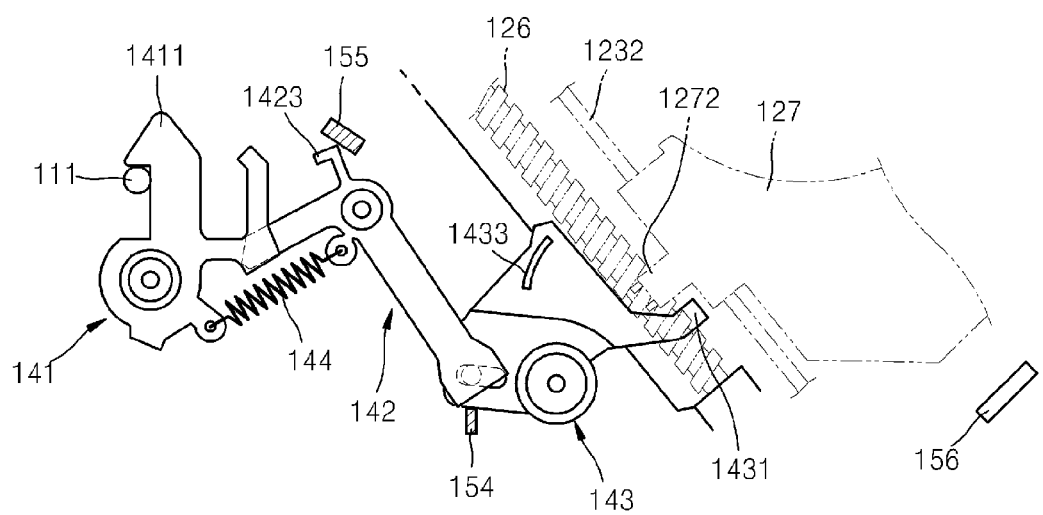
FIGS. 6 through 8 are drawings illustrating examples of operations of a lock releasing unit.
Figure 7:
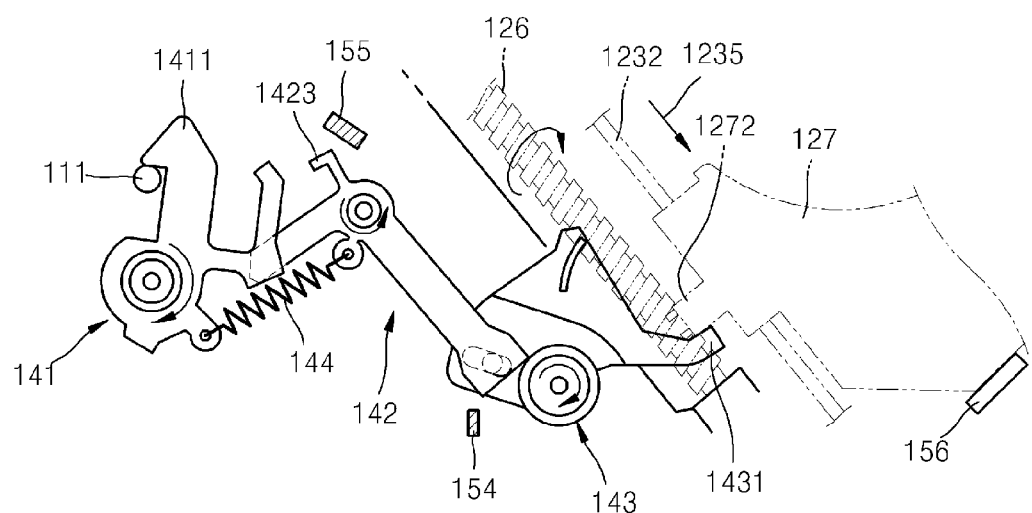
Figure 8:
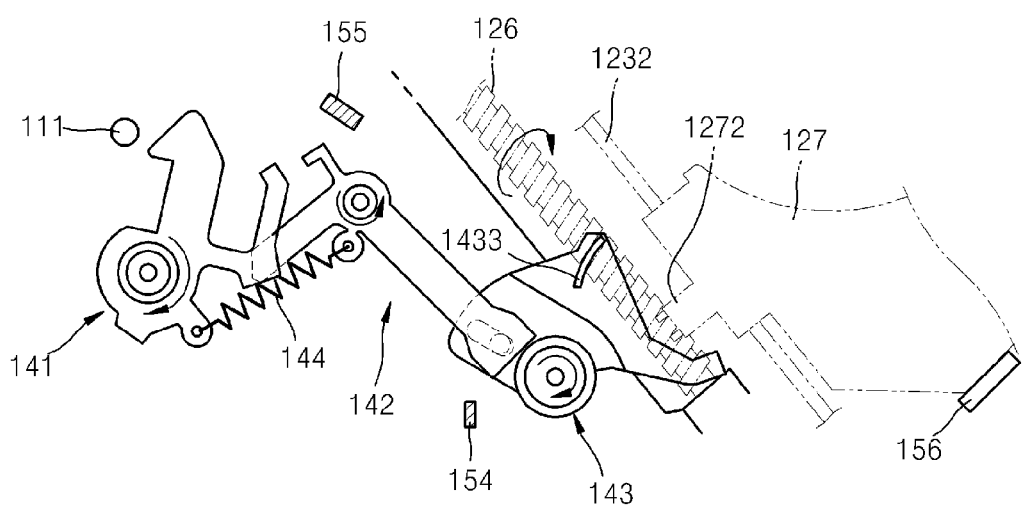

FIGS. 6 through 8 are drawings illustrating examples describing operations of a lock releasing unit.

Referring to FIG. 6, a tray (e.g., tray 120 of FIG. 2) is inserted into a main chassis (e.g., main chassis 110 of FIG. 2), and thus the hook 1411 is engaged with the locking protrusion 111. The current state illustrated in FIG. 6 of the lock releasing unit 140 is identical to an initial state of the lock releasing unit 140 as described above. In other words, the link unit 143 engages the stopper 154, the position defining unit 1423 engages the frame 155, and the spring 144 applies an elastic force to the lock lever unit 141 in a counterclockwise direction of FIG. 6. For example, the spring may apply the elastic force to the lock lever unit 141 so as to bias the hook 1411 towards an engagement position in which the hook 1411 engages the locking protrusion 111. Accordingly, the lock lever unit 141 is inhibited or otherwise prevented from rotating in a clockwise direction of FIG. 6. The hook 1411 may engage with the locking protrusion 111 in an initial or locked state. As a result, the tray (e.g., tray 120 of FIG. 2) may remain inserted in the main chassis (e.g., main chassis 110 of FIG. 2) in a locked state. In a locked state, the tray 120 may be inhibited from unintentionally ejecting from the main chassis 110.

In this initial state, the driving force transmitting unit 1433 does not contact the lead screw 126, and the interfering unit 1431 does not contact the feeding guide 1272 of the pickup base 127. The pickup base 127 receives a rotation force of the lead screw 126 via the feeding guide 1272 and moves back and forth in a straight line in a radial direction of a disk to allow a pickup unit (e.g., a pickup unit 1271 of FIG. 1) to read out data stored in the disk or write data to the disk. Because the pickup base moves along a straight line in a radial direction of a disk so as to allow read and write operations to and from a disk, the position of the pickup base 127 and is not limited to the position shown in FIG. 6. As the pickup unit (e.g., pickup unit 1271 of FIG. 1) is reading data from or writing data to the disk, the feeding guide 1272 of the pickup base 127 does not contact the interfering unit 1431. In other words, even if the pickup base 127 is positioned at an outermost point relating to a point that is substantially along the outer circumference of a disk, the feeding guide 1272 of the pickup base 127 does not contact the interfering unit 1431.

Referring to FIG. 7, if a lock releasing signal is input, a control unit (not shown) drives a step motor (e.g., step motor 125 of FIG. 2) that in turn rotates the lead screw 126 so as to move the pickup base 127 in a direction indicated by an arrow 1235 by the lead screw 126. As the feeding guide 1272 engages the interfering unit 1431, which thereby transfers a rotational force to the link unit 143. Accordingly, the link unit 143 rotates in a clockwise direction of FIG. 7. The link unit 143 transfers a rotational force to the connecting unit 142 which is operatively connected to the link unit 143. Thus, the connecting unit 142 rotates in a counterclockwise direction. In turn, the connecting unit 142 transfers a rotational force to the lock lever unit 141 which is operatively connected to the connecting unit 142. Thus, the lock lever unit 141 rotates in the clockwise direction. Therefore, the link unit 143 is separated from the stopper 154, and the position defining unit 1423 is separated from the frame 155. Furthermore, as the link unit 143 rotates, the driving force transmitting unit 1433 is combined with the lead screw 126. Accordingly, the pickup base 127 engages the pickup base position defining unit 156 formed on the bottom surface 1202 of a tray (120 of FIG. 1) and movement thereof is restricted.

In other words, the driving force transmitting unit 1433 engages the lead screw 126 as the pickup base 127 engages the pickup base position defining unit 156. For example, if the pickup base 127 is stopped by the pickup based position defining unit 156, the driving force transmitting unit 1433 engages the lead screw 126.

However, rotation of the link unit 143 due to movement of the pickup base 127 before the pickup base 127 engages the pickup base position defining unit 156 is insufficient to release the hook 1411 from the locking protrusion 111. Therefore, the hook 1411 is still combined with the locking protrusion 111.

Movement of the pickup base 127 before the pickup base 127 contacts the pickup base position defining unit 156 simply combines the driving force transmitting unit 1433 with the lead screw 126 and thus may not release the hook 1411 from the locking protrusion 111.

Particularly, even if the pickup base 127 suddenly/spontaneously moves if an external shock is applied to a disk drive, movement of the pickup base 127 is restricted to the state shown in FIG. 7. Therefore, even if a sudden/spontaneous external shock is applied to a disk drive, a lock of a tray is not released from a main chassis.

Referring to FIG. 8, if the driving force transmitting unit 1433 engages the lead screw 126, a step motor (e.g., step motor 125 of FIG. 2) further rotates the lead screw 126. As the step motor further rotates the lead screw 126, the pickup base 127 engages the pickup base position defining unit 156. The pickup base position defining unit 156 restricts further movement of the pickup base 127 in such a direction. Accordingly, the lead screw 126 may not move the feeding guide 1272. Therefore, the link unit 143 rotates in a clockwise direction in FIG. 8, and the interfering unit 1431 is separated from the feeding guide 1272.

Rotation of the link unit 143 is transmitted to the lock lever unit 141 via the connecting unit 142. Thus, the hook 1411 is released from the locking protrusion 111. At this point, the spring 144 is maximally extended. Therefore, the tray 120 is released or unlocked from the main chassis 110 (refer to FIG. 1) and may therefore be ejected from the main chassis 110.

Figure 9:
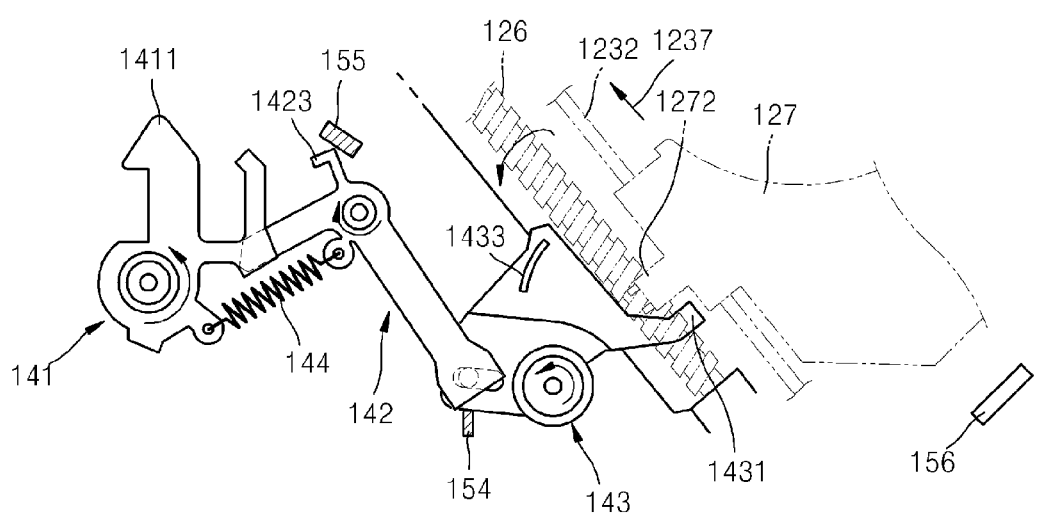
FIG. 9 is a drawing illustrating an example of an operation of returning the lock releasing unit to an initial position.

FIG. 9 is drawing illustrating an example of an operation of returning a lock releasing unit to an initial position.

FIG. 9 shows an operation for returning the lock releasing unit 140 to the initial position, such that the hook 1411 may engage a locking protrusion (e.g., locking protrusion 111 of FIG. 1) when a tray (e.g., tray 120 of FIG. 1) is re-inserted into a main chassis (e.g., main chassis 110 of FIG. 1).

To return the lock releasing unit 140 to the initial position, a control unit (not shown) drives a step motor (e.g., step motor 125 of FIG. 2) to rotate in a direction opposite to the direction used to eject the tray. For example, the step motor may rotate in a counterclockwise direction. Accordingly, the lead screw 126 also reversely rotates, and thus the driving force transmitting unit 1433 begins to be separated from the lead screw 126. Furthermore, because an elastic force of the spring 144 is applied, as the link unit 143 rotates in the counterclockwise direction in FIG. 9, the connecting unit 142 connected to the link unit 143 rotates in a clockwise direction of FIG. 9, and the lock lever unit 141 connected to the connecting unit 142 rotates in the counterclockwise direction of FIG. 9. Furthermore, the position defining unit 1423 engages the frame 155, and the link unit 143 engages the stopper 154. A current state of the lock releasing unit 140 is the initial position of the lock releasing unit 140 shown in FIG. 6. Meanwhile, as a rotation force of the lead screw 126 is transmitted to the pickup base 127 via the feeding guide 1272, the pickup base 127 moves in a direction indicated by an arrow 1237 and is separated from the pickup base position defining unit 156. In other words, as the pickup base 127 moves in the direction indicated by arrow 1237, the pickup base 127 moves away from the pickup position defining unit 156.

As an example, in an aspect, there is provided a disk drive that has a lock releasing unit that does not utilize a solenoid. Because a solenoid is not required to drive the lock releasing unit, a disk drive may have a less burdensome structure. Accordingly, the manufacturing costs associated with manufacturing a disk drive may be reduced. Furthermore, based on a design such as the examples described above, even if a pickup base suddenly/spontaneously slides due to an external shock, a lock releasing unit does not operate. In other words, in examples described above, an unintentional external shock to the disk drive will not release the lock which maintains the tray in a locked position.

Disk drives as described in the above examples may be included in an electronic device. As a non-exhaustive illustration only, an electronic device described herein may refer to mobile devices such as a digital camera, a portable game console, a portable/personal multimedia player (PMP), a portable lap-top PC, and devices such as a desktop PC, a high definition television (HDTV), an optical disc player, a set top box, and the like capable of wireless communication or network communication consistent with that disclosed herein.

The units described herein may be implemented using hardware components and software components. For example, microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A disk drive comprising:
a main chassis;
a tray that is configured to have a disk removably mounted thereon and that is installed to slide into/out of the main chassis, the tray comprising a pickup transporting unit that is configured to move a pickup base back and forth in a radial direction of the disk; and
a lock releasing unit which is arranged on the tray, is driven by the pickup transporting unit, and releases a lock of the tray from the main chassis,
wherein the lock releasing unit comprises a lock lever unit which is rotatably installed on the tray, a link unit which is rotatably installed on the tray, and a connecting unit which is rotatably installed on the tray and connects the lock releasing unit and the lock lever unit.

2. The disk drive of claim 1, wherein:
the lock lever unit comprises a hook which is to be combined with a locking protrusion arranged on the main chassis;
the link unit comprises a driving force transmitting unit, wherein the driving force transmitting unit is combined with the pickup transporting unit and receives a rotation force; and
the connecting unit rotates the lock lever unit by transferring to the lock lever unit a force which is based on a rotation force that the connecting unit receives from the link unit.

3. The disk drive of claim 2, wherein the link unit further comprises an interfering unit that is configured to move based on its engagement with a feeding guide that operatively connects the pickup base to the pickup transporting unit, and
if the interfering unit engages the feeding guide and the link unit rotates, the driving force transmitting unit is combined with the pickup transporting unit.

4. The disk drive of claim 3, wherein the lock releasing unit further comprises a spring which is fixed to the lock lever unit and the connecting unit, and which applies an elastic force in a direction in which the hook is engaged with the locking protrusion.

5. The disk drive of claim 2, wherein the driving force transmitting unit is formed of a protrusion having a predetermined height which is configured to be combined with a lead screw of the pickup transporting unit.

6. The disk drive of claim 5, further comprising a pickup base position defining unit that defines a position of the pickup base under the condition that the driving force transmitting unit is combined with the lead screw.

7. The disk drive of claim 2, further comprising a stopper which is arranged on the tray so as to define an initial position of the lock releasing unit, the stopper being arranged so as to engage the link unit.

8. The disk drive of claim 7, further comprising a position defining unit that defines the initial position of the lock releasing unit, that is installed on the connecting unit, and that contacts a frame of the tray when the link unit contacts the stopper.

9. An electronic device, the electronic device including the disk drive of claim 1.

10. The electronic device of claim 9, wherein the electronic device is one of a portable game console, a portable/personal multimedia player (PMP), a portable lap-top PC, a desktop PC, a game console, a high definition television (HDTV), an optical disc player/recorder, and a set top box.

11. A disk drive comprising:
a main chassis;
a tray that is configured to have a disk removably mounted thereon and that is installed to slide into/out of the main chassis, the tray comprising a pickup transporting unit that comprises a lead screw and a step motor that is configured to rotate the lead screw and to move a pickup base back and forth in a radial direction of the disk; and
a lock releasing unit that is arranged on the tray, that is configured so as to not release a lock of the tray in response to the lock releasing unit being initially combined with the lead screw by the pickup base, and that is configured to release the lock of the tray from the main chassis in response to the lock releasing unit being combined with the lead screw and the lock releasing unit being driven by the lead screw.

12. The disk drive of claim 11, wherein the lock releasing unit comprises:
a lock lever unit which is rotatably installed on the tray and which comprises a hook which is to be combined with a locking protrusion arranged on the main chassis;
a link unit which is rotatably installed on the tray and which comprises
a driving force transmitting unit, wherein the driving force transmitting unit is combined with the pickup transporting unit and receives a rotation force, and
an interfering unit that is configured to move based on its engagement with a feeding guide that operatively connects the pickup base to the pickup transporting unit; and
a connecting unit which is rotatably installed on the tray, is connected to the lock lever unit and the link unit, and rotates the lock lever unit by transferring to the lock lever unit a force which is based on a rotation force that the connecting unit receives from the link unit.

13. The disk drive of claim 12, wherein the lock releasing unit further comprises a spring which is fixed to the lock lever unit and the connecting unit, and which applies an elastic force in a direction in which the hook is engaged with the locking protrusion.

14. The disk drive of claim 13, wherein the driving force transmitting unit is formed of a protrusion having a predetermined height which is configured to be combined with a lead screw of the pickup transporting unit.

15. The disk drive of claim 14, further comprising a pickup base position defining unit that defines a position of the pickup base under the condition that the driving force transmitting unit is combined with the lead screw.

16. The disk drive of claim 14, further comprising a stopper which is arranged on the tray so as to define an initial position of the lock releasing unit, the stopper being arranged so as to engage the link unit.

17. The disk drive of claim 16, further comprising a position defining unit that defines the initial position of the lock releasing unit, that is installed on the connecting unit, and that contacts a frame of the tray when the link unit contacts the stopper.

18. An electronic device, the electronic device including the disk drive of claim 11.

19. The electronic device of claim 18, wherein the electronic device is one of a portable game console, a portable/personal multimedia player (PMP), a portable lap-top PC, a desktop PC, a game console, a high definition television (HDTV), an optical disc player/recorder, and a set top box.

20. A method of releasing lock of a tray from a main chassis: by using a lock releasing unit which comprises a lock lever unit which is rotatably installed on the tray and which comprises a hook that is to be combined with a locking protrusion arranged on the main chassis; a link unit that is rotatably installed on the tray and comprises a driving force transmitting unit, wherein the driving force transmitting unit is combined with the pickup transporting unit and receives a rotation force, and an interfering unit that is configured to be moved based on contact with a feeding guide that connects the pickup base to the pickup transporting unit; and a connecting unit that is rotatably installed on the tray, is connected to the lock lever unit and the link unit, and rotates the lock lever unit by using a rotation force of the link unit, the method comprising:

combining the lock releasing unit with the pickup transporting unit;
releasing a lock of the tray from the main chassis; and
returning the lock releasing unit to the initial position thereof.

21. The method of claim 20, wherein, during the step of combining the lock releasing unit with the pickup transporting unit, the pickup base is moved in the outer circumferential direction of the disk by rotating the step motor according to a lock releasing signal, the link unit rotates as the feeding guide engages the interfering unit; and
the driving force transmitting unit is combined with the lead screw due to the rotation of the link unit.

22. The method of claim 21, wherein, during the step of releasing lock of the tray from the main chassis, the step motor is driven and rotates the lead screw, the driving force transmitting unit moves together with the lead screw and rotates the link unit, and
if the rotation of the link unit is transmitted to the lock lever unit via the connecting unit, the lock lever unit rotates, and the hook is released from the locking protrusion.

23. The method of claim 22, wherein, if the hook is separated from the locking protrusion, movement of the pickup base is restricted by the pickup base position defining unit, and a position of the pickup base is unchanged.

24. The method of claim 23, wherein, during the step of returning the lock releasing unit to the initial position thereof, the lead screw reversely rotates as the step motor reversely rotates, the driving force transmitting unit moves together with the lead screw and reversely rotates the link unit, and
as the driving force transmitting unit is separated from the lead screw, the link unit is returned to the initial position.

* * * * *